United States Patent
Van Nutt et al.

(10) Patent No.: US 8,771,444 B2
(45) Date of Patent: *Jul. 8, 2014

(54) LOW EMISSIVITY AND EMI SHIELDING WINDOW FILMS

(71) Applicant: CPFilms Inc., Fieldale, VA (US)

(72) Inventors: Charles Nicholas Van Nutt, Martinsville, VA (US); James Peyton Enniss, Martinsville, VA (US); Jaime Antonio Li, Martinsville, VA (US); Anthony Brian Port, Collinsville, VA (US); Scott E. Pickett, Martinsville, VA (US); Jeremy B. Stegall, Christiansburg, VA (US); Coby Lee Hubbard, Patrick Springs, VA (US); Rita M. Phillips, Bassett, VA (US); Steven Allen Barth, Martinsville, VA (US)

(73) Assignee: CPFilms Inc., Fieldale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/940,569

(22) Filed: Aug. 6, 2013

(65) Prior Publication Data

US 2013/0342899 A1     Dec. 26, 2013

Related U.S. Application Data

(60) Division of application No. 13/222,589, filed on Aug. 31, 2011, now Pat. No. 8,613,822, which is a continuation of application No. 13/037,120, filed on Feb. 28, 2011, now Pat. No. 8,637,169.

(60) Provisional application No. 61/339,152, filed on Mar. 1, 2010.

(51) Int. Cl.
     *B32B 37/00*     (2006.01)

(52) U.S. Cl.
     USPC ............................... 156/71; 156/99; 156/109

(58) Field of Classification Search
     USPC ............................................ 156/71, 99, 109
     See application file for complete search history.

(56) References Cited

U.S. PATENT DOCUMENTS

| | | | |
|---|---|---|---|
| 2,663,157 | A | 12/1953 | Laramy |
| 3,601,471 | A | 8/1971 | Seddon |

(Continued)

FOREIGN PATENT DOCUMENTS

| | | |
|---|---|---|
| JP | 1-206035 A | 8/1989 |
| JP | 2007-183562 A | 7/2007 |

(Continued)

OTHER PUBLICATIONS

Parry Moon, "Proposed Standard Solar-Radiation Curves for Engineering Use," Journal of the Franklin Institute, vol. 230, 99 583-617 (1940).

(Continued)

*Primary Examiner* — Katarzyna Wyrozebski Lee
*Assistant Examiner* — John Blades
(74) *Attorney, Agent, or Firm* — Eric D. Middlemas

(57) ABSTRACT

A low emissivity and EMI shielding transparent composite film typically for use in association with window glazing and comprising a transparent film substrate having on one side thereof an underlayer of abrasion resistant hardcoat material with at least one infrared reflective layer covering the underlayer, typically a metallic layer which may be encased in metal oxide layers, which is then covered with a thin external protective top coat of a cured fluorinated resin.

18 Claims, 1 Drawing Sheet

(56) References Cited

U.S. PATENT DOCUMENTS

| | | | |
|---|---|---|---|
| 3,682,528 | A | 8/1972 | Apfel et al. |
| 4,613,530 | A | 9/1986 | Hood et al. |
| 4,799,745 | A | 1/1989 | Meyer et al. |
| 5,071,206 | A | 12/1991 | Hood et al. |
| 5,744,227 | A | 4/1998 | Bright et al. |
| 5,783,049 | A | 7/1998 | Bright et al. |
| 6,007,901 | A | 12/1999 | Maschwitz et al. |
| 6,030,671 | A | 2/2000 | Yang et al. |
| 6,221,112 | B1 | 4/2001 | Snider |
| 6,239,910 | B1 * | 5/2001 | Digert ............... 359/596 |
| 6,261,694 | B1 | 7/2001 | Iacovangelo |
| 6,852,419 | B2 | 2/2005 | Stachowiak |
| 6,859,310 | B2 | 2/2005 | Simpson et al. |
| 6,891,667 | B2 | 5/2005 | Simpson et al. |
| 6,929,864 | B2 | 8/2005 | Fleming et al. |
| 7,177,075 | B2 | 2/2007 | Simpson et al. |
| 7,186,465 | B2 | 3/2007 | Bright |
| 7,261,950 | B2 | 8/2007 | Fleming et al. |
| 7,276,291 | B2 | 10/2007 | Bright |
| 7,295,368 | B2 | 11/2007 | Simpson et al. |
| 7,405,872 | B2 | 7/2008 | Simpson et al. |
| 7,596,850 | B2 | 10/2009 | Barth et al. |
| 7,659,002 | B2 | 2/2010 | Coster et al. |
| 2003/0228484 | A1 | 12/2003 | Finley et al. |
| 2004/0033369 | A1 | 2/2004 | Fleming et al. |
| 2005/0181123 | A1 | 8/2005 | Fleming et al. |
| 2005/0247470 | A1 | 11/2005 | Fleming et al. |
| 2007/0154721 | A1 | 7/2007 | Wang et al. |
| 2007/0281171 | A1 | 12/2007 | Coster et al. |
| 2008/0187728 | A1 | 8/2008 | Borowiec et al. |
| 2009/0303602 | A1 | 12/2009 | Bright et al. |
| 2010/0316852 | A1 | 12/2010 | Condo et al. |

FOREIGN PATENT DOCUMENTS

| | | | |
|---|---|---|---|
| WO | WO 2004/087415 | A2 | 10/2004 |
| WO | WO 2009/085741 | A2 | 7/2009 |

OTHER PUBLICATIONS

International Search Report and Written Opinion, International Patent Application No. PCT/US2011/026514, mailed Nov. 4, 2011.

International Search Report and Written Opinion, International Patent Application No. PCT/US2012/034630, mailed Jul. 11, 2012.

Co-pending U.S. Appl. No. 13/037,120, filed Feb. 28, 2011; Charles Nicholas Van Nutt et al.

Co-pending U.S. Appl. No. 13/222,589, filed Aug. 31, 2011; Charles Nicholas Van Nutt et al.

Co-pending U.S. Appl. No. 13/451,923, filed Apr. 20, 2012; Charles Nicholas Van Nutt et al.

USPTO Office Action dated Mar. 2, 2012 for co-pending U.S. Appl. No. 13/222,589.

USPTO Office Action dated Aug. 2, 2012 for co-pending U.S. Appl. No. 13/222,589.

USPTO Office Action dated Feb. 27, 2013 for co-pending U.S. Appl. No. 13/222,589.

USPTO Office Action dated Apr. 18, 2013 for co-pending U.S. Appl. No. 13/037,120.

USPTO Notice of Allowance dated Jun. 10, 2013 for co-pending U.S. Appl. No. 13/222,589.

USPTO Office Action dated Jul. 9, 2013 for co-pending U.S. Appl. No. 13/451,923.

USPTO Notice of Allowance dated Sep. 19, 2013 for co-pending U.S. Appl. No. 13/037,120.

Co-pending U.S. Appl. No. 14/075,057, filed Nov. 8, 2013; Charles Nicholas Van Nutt et al.

Co-pending U.S. Appl. No. 14/075,074, filed Nov. 8, 2013; Charles Nicholas Van Nutt et al.

USPTO Notice of Allowance dated Dec. 9, 2013 for co-pending U.S. Appl. No. 13/451,923.

Co-pending U.S. Appl. No. 14/136,834, filed Dec. 20, 2013; Charles Nicholas Van Nutt et al.

USPTO Corrected Notice of Allowance dated Aug. 1, 2013 for co-pending U.S. Appl. No. 13/222,589.

USPTO Corrected Notice of Allowance dated Aug. 19, 2013 for co-pending U.S. Appl. No. 13/222,589.

USPTO Office Action dated Jan. 28, 2014 for co-pending U.S. Appl. No. 14/075,057.

* cited by examiner

LOW EMISSIVITY AND EMI SHIELDING WINDOW FILMS

CROSS REFERENCE TO RELATED APPLICATION(S)

This application is a divisional of U.S. application Ser. No. 13/222,589, filed Aug. 31, 2011, which is a continuation of U.S. patent application Ser. No. 13/037,120, filed Feb. 28, 2011, which in turn claims the benefit of U.S. Provisional Patent Application Ser. No. 61/339,152, filed Mar. 1, 2010. The entire disclosure of each of these documents is herein incorporated by reference.

BACKGROUND OF THE INVENTION

1. Field of the Invention

This disclosure is related to the field of window films having low emissivity (low e) for minimizing transfer of thermal energy by radiation, and that are suitable in electromagnetic interference (EMI) shielding applications.

2. Description of Related Art

Glass windows with a low emissivity (low e) are designed to allow frequencies in a specific bandwidth to pass through the window, such as visible light, while reflecting other frequencies outside of this desired bandwidth, such as infrared (IR). The low emissivity creates a high reflection of certain waves in the IR spectrum and serves to improve the thermal insulation of windows in buildings and vehicles. Thus, these low e windows find particular use in cold climates for preserving the heat in homes, offices, and automobiles and other heated environments, mitigating the escape of the warm interior air to the cold exterior via the window. These low e windows are also useful in hot climates for rejecting thermal energy radiation from the heated exterior via the window and thereby maintaining the cooler temperature of the interior. These windows are effective in providing comfort, visibility, and increased energy efficiency.

Window glass itself may be manufactured to provide the low e characteristics. During the manufacturing process and prior to installation, the glass is treated and/or coated with thin metallic layers, among others, to achieve the desired IR reflection. Examples of such treating and coating are described in U.S. Pat. Nos. 6,852,419 and 7,659,002. This treated glass, however, is problematic for several reasons. Firstly, it generally does not provide adequate protection against ultraviolet (UV) radiation. Secondly, the metal or other coating may not be sufficiently protected against the environment, resulting in a decreased mechanical strength and subjecting the glass to corrosion. In this regard, if or when the glass corrodes or breaks, the entire window must be replaced. Not only is this costly, but it can also be difficult to match the appearance and color of the original surrounding glass windows.

A more practical and economically efficient approach has been to utilize flexible polymeric films that can be adhered to the window glass. Such films are in widespread use and provide a variety of solar control functions. The films are easy to apply, can conveniently be removed and replaced, and can readily be made to duplicate the color and appearance of the film that is being replaced. Also, flexible films facilitate retrofitting of existing clear glass window panes and can impart solar control functions to the same. In this regard, the polymeric films also supply a level of protection from UV damage to household items, for example, fading of furniture.

The majority of solar control films are made by metalizing a polymeric substrate film, usually poly(ethylene terephthalate) (PET), and then laminating a second film of PET onto the metalized surface of the substrate film. These prior solar control films, however, sacrifice visible light transmittance (i.e., the amount of visible light that passes through the film, "VLT") to achieve the desired emissivity, or vice versa, and have been limited to emissivities on the order of about 0.3, at best.

An example of such low e window film (on the order of about 0.3) is disclosed in U.S. Pat. No. 6,030,671. This and other previous low e window films utilize a metallic layer to reflect the IR radiation; however, metal is susceptible to corrosion, scratching, and abrasion. Thus, in such an application, a protective hardcoat is placed over the metal layers and facing the interior space to be reflected (i.e., the interior of the room). This protective hardcoat is a conventional cross-linked acrylate polyester based coating, and is necessary to supply the film with resistance to cracking, corrosion, scratching, and abrasion.

Since this hardcoat is IR absorbing and located between the IR reflective metallic layer and the interior of the room, it decreases the composite emissivity of the film. Thus, the hardcoat thickness resulted in a compromise between being sufficiently thick to function as a protective coat, whilst keeping IR absorption to a minimum. In any event, the hardcoat generally did not provide sufficient abrasion resistance, and when the hardcoat was thick enough to supply the film with the necessary durability, there remained serious detrimental effects on the emittance values. For example, U.S. Pat. No. 6,030,671 describes the thickness of hard coat placed over the optical layers (i.e., the PET and metallic layers) as being between 1-3 microns, and a hardcoat having a thickness of 3.0 microns will result in film composite having an emissivity of greater than 0.35. Additionally, in order to achieve this composite emissivity of the film, the visible light transmittance (VLT) was limited to about 50%.

In addition to managing IR radiation, there exists a need to control electromagnetic radiation. Electromagnetic radiation of various frequencies is radiated from many devices used in a wide range of facilities including homes, workplaces such as offices, manufacturing and military installations, ships, aircraft and other structures. Examples of such devices include computers, computer monitors, computer keyboards, radio equipment, communication devices, etc. If this radiation escapes from the facility, it can be intercepted and analyzed for the purpose of deciphering data associated with or encoded in the escaped radiation. For example, technology exists for reconstructing the image appearing on a computer monitor in a building from a remote location outside the building or from a location within a building by detecting certain wavelength frequencies from the monitor screen even if the monitor screen is not in view from the remote location. This is accomplished by known techniques wherein certain frequencies of light from the monitor screen, even after being reflected from various surfaces inside the building or room where the monitor is located, escape and are intercepted and analyzed by an eavesdropper in another location outside the building or room where the monitor is located. Obviously, the ability of an eavesdropper to intercept such radiation constitutes a significant security risk, which is desirably eliminated from facilities where secrecy is essential.

Although walls, such as brick, masonry block or stone walls may effectively prevent the escape of light frequencies from a facility, radio frequencies pass through walls that are not properly shielded to prevent such passage. Moreover, windows allow the passage of radiation to the outside where it can be intercepted, and can permit entry of various forms of radiation, such as laser beams, infrared, and radio frequencies, into the facility. As a result, sensitive or secret data may be gathered from within the structure.

Indeed, the United States Government has long been concerned by the fact that electronic equipment, such as computers, printers, and electronic typewriters, give off electronic emanations. The TEMPEST (an acronym for Transient Electromagnetic Pulse Emanation Standard) program was created to introduce standards that would reduce the chances of leakage of emanations from devices used to process, transmit, or store sensitive information. This is typically done by either designing the electronic equipment to reduce or eliminate transient emanations, or by shielding the equipment (or sometimes a room or entire building) with copper or other conductive materials. Both alternatives can be extremely expensive.

The elimination of windows from a structure would obviously minimize the above-noted security risk. The disadvantages of a windowless or enclosed structure, however, are self-evident. It would be highly desirable, therefore, to prevent the escape of radiation associated with data through windows while allowing other radiation to pass through so that the enjoyment of the visual effects provided by the windows can be obtained without an undue security risk.

The need for reducing the undesirable effects of electromagnetic radiation has led to the development of window filters and films to block the transmission of unwanted electromagnetic interference (EMI). These EMI shielding films, however, generally do not have the desirable low e and high VLT discussed above.

Given both the endless need to improve energy efficiency and the importance of security in today's competitive marketplace, a film that could preserve both energy and electronic privacy while maintaining adequate protection from the exposed environment is needed.

SUMMARY OF THE INVENTION

Because of these and other problems in the art, described herein, among other things is a low emissivity transparent composite film comprising: a transparent film substrate; an underlayer of abrasion resistant hardcoat material compatible with the transparent film substrate; and at least one infrared reflective layer; the composite film having an emissivity of less than about 0.30 and wherein the underlayer is disposed between the transparent film substrate and the infrared reflective layer.

In certain embodiments, the infrared reflecting layer can be comprised of a metallic layer selected from the group consisting of aluminum, copper, gold, nickel, silver, platinum, palladium, tungsten, titanium, or alloys thereof. In another embodiment, the composite film further comprises a transparent protective top coat having a dried thickness of less than about 0.5 microns and the protective top coat is disposed over the infrared reflective layer.

The underlayer can have an abrasion delta haze of less than about 5 percent. In some embodiments, the infrared reflective layer includes at least one thin metal film capable of protecting the infrared reflective layer. In another embodiment, the thin metal film is comprised of a metal selected from the group consisting of nickel, chromium, nobium, platinum, cobalt, zinc, molybdenum, zirconium, vanadium and alloys thereof. In yet another embodiment, the thin metal film is comprised of a nickel-chromium alloy.

The composite film may also include at least one spacer layer comprised of a transparent conductive layer, a dielectric layer, or combinations thereof. In one embodiment, the spacer layer comprises a material selected from the group consisting of indium oxide, indium zinc oxide, or indium tin oxide.

The composite film may also include a plurality of thin spacer layers disposed between a plurality of transparent conductive layers.

Also disclosed herein is a low emissivity transparent composite film comprising: a transparent film substrate; an underlayer of abrasion resistant hardcoat material compatible with the transparent film substrate; and at least one infrared reflective layer; the composite film having an emissivity of less than about 0.25.

The composite film could also have emissivity of less than about 0.20. In one embodiment, the composite film has a visible light transmission of up to about 75 percent.

The composite film could also have an emissivity of less than about 0.10. In one embodiment, the composite has a visible light transmission of about 28 percent to about 47 percent. In another embodiment, the composite film has a visible light transmission up to about 70 percent.

In certain embodiments, the abrasion resistant hardcoat material of the composite film is selected from the group consisting of highly crosslinked polymer coatings, thermally cured acrylate coatings, thermally cured sol gel coatings based on silicates, titanates, zirconates, or mixtures thereof, hybrid organic-inorganic sol gel materials, thermally cured siloxane hardcoats, and thermally cured polyacrylate coatings. In one embodiment, the underlayer is comprised of an ultraviolet cured polyacrylate composition. In another embodiment, the underlayer is comprised of an ultraviolet cured polyacrylate composition containing metal oxide nanoparticles.

In other embodiments, the infrared reflecting layer may be comprised of a metallic layer selected from the group consisting of aluminum, copper, gold, nickel, silver, platinum, palladium, tungsten, titanium, or alloys thereof.

A method of manufacturing of a low emissivity transparent composite film is also disclosed. The method comprises the following steps: providing a transparent film substrate; mixing an abrasion resistant hardcoat material comprising a polyacrylate composition to form a mixture; applying the mixture to one side of the transparent film substrate; curing the coated side of the substrate to form an underlayer; and sputtering an infrared reflecting layer on the underlayer.

DESCRIPTION OF THE PREFERRED EMBODIMENT(S)

Figure 1:
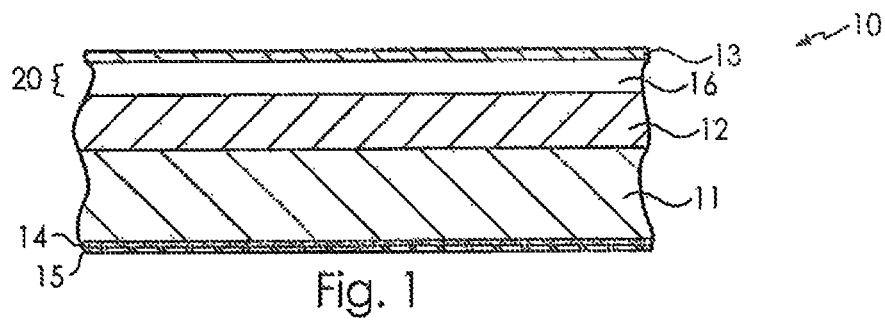
FIG. 1 is a cross-sectional view of one embodiment of a low emissivity and EMI shielding window film which includes a protective top coat, an adhesive layer, and a release liner.

Described herein, among other things, are composite films which have a significant reduction in emissivity compared to conventional window films while also allowing a desirable level of visible light transmission (VLT), increasing resistance to abrasion and cracking, and shielding electromagnetic interference (EMI). In one embodiment, this composite film is comprised of a transparent film substrate having on one side thereof an underlayer comprising an abrasion resistant cured acrylate resin and at least one infrared reflective layer covering the underlayer.

The underlayer advantageously increases the mechanical strength and, surprisingly, the abrasion resistance of the composite film, even though the underlayer is not on the exterior of the composite film. In other words, the underlayer is between the surface to which the composite is attached and the IR reflective layer; thus, the IR reflective layer is more closely exposed to the area desired to reflected. Thus, if the composite film is placed on the interior of a window, the IR from the interior of the room would not have to pass through the underlayer in order to be reflected therefrom. Alternatively, if the composite film is placed on the exterior of the window, again, the IR from the outside or exterior would not have to pass through the underlayer in order to be reflected therefrom. As a result, the emissivity (i.e., the ability to emit or radiate the IR) of the composite film can be greatly decreased.

The composite films are typically applied to the interior or exterior surface of a window, and preferably the interior. As used herein, the "top" is the side of the composite that is exposed to area desired to be reflected. In this regard, the emissivity of the film is a measurement of the emittance of IR energy from the "top" surface (e.g., the IR energy reflected back into the room when placed on the interior of the window). The "bottom," on the other hand, is the side of the composite that is attached to the window. For purposes of this disclosure, it should also be recognized that IR energy as used herein is generally discussing long wavelength IR radiation, which is more directly associated with heat than shorter wavelength IR radiation. However, any wavelength of IR radiation can be reflected.

It should be noted, however, that while the composite films are often specifically discussed for use as window films in this application, it would be understood by one of ordinary skill that numerous other applications are appropriate. For example, the composite film could be attached to the wall of a building or temporary structure for use as an insulation layer or as a heat retaining layer to reflect heat back into a room. In this regard, the composite film could be also be decorated and attached to a wall to form a decorative layer over the wall. The composite film could also be placed on the exterior of cold or refrigerated space in order to keep heat from entering this space. Additionally, without the adhesive layer discussed below as part of the composite, the composite films could be employed in a roller form for use as tents, awnings, shades, or blinds—suspended in proximity to a window or skylight but not adhered thereto. For such applications, it may be desirable to have a very low visible light transmission in order to block as much light as possible while still reflecting and retaining heat interior to the composite film. The composite film with the adhesive layer could also be used in the air gap of insulated glazings. These additional uses are merely exemplary and are in no way limiting. Accordingly, it should be understood that when use as window film is described in this application, other uses also apply, as would be known to one of ordinary skill in the art.

In order to understand the composite film of the present disclosure, it is also important to have an understanding of the properties and characteristics associated with a composite film and the tests by which these properties and characteristics of a polymer interlayer sheet are measured. Emissivity is the relative ability of a material's surface to emit or reflect energy by radiation, such as IR radiation. Stated differently, thermal radiation heat transfer is reduced if the surface of a material has a low emissivity. It is the ratio of energy radiated by a particular material to energy radiated by a black body at the same temperature and is measured according to ASTM C1371-04A. The composite films of the present disclosure have an emissivity of: less than about 0.38; less than about 0.35; less than about 0.3; less than about 0.25; less than about 0.2; less than about 0.17; less than about 0.15; less than about 0.1; less than about 0.07; less than about 0.03; about 0.2 to about 0.3; about 0.07 to about 0.10; about 0.08; and about 0.17.

The percent total solar energy rejection (% TSER) is, as the name implies, the total solar energy (heat) rejected by the composite film. The higher the number, the more total solar energy (heat) that is rejected. It is calculated from optical and heat rejection properties of coated film measured on a Varian Analytical Cary 5 spectrophotometer in accordance with ASTM E903-82, the reflection and transmission data being analyzed using parameters as described by Parry Moon in "Proposed Standard Solar-Radiation Curves for Engineering Use," Journal of the Franklin Institute Vol. 230 pp 583-618 (1940), the entire disclosure of which is hereby incorporated by reference.

The solar energy absorption is the percent of incident solar radiation that is absorbed by the window film. The lower the number, the less solar radiation absorbed. The solar reflectance is the percent of incident solar radiation that is reflected by the window film/glass system. The lower the number, the less solar radiation reflected. Both the solar absorption and reflectance can be measured using the above method for measuring percent total solar energy rejection.

The visible light transmission is the percent of total visible light that is transmitted through the window film/glass system. The lower the number, the less visible light transmitted. It is calculated using CIE Standard Observer (CIE 1924 1931) and D65 Daylight. The composite films of the present disclosure have a visible light transmission, depending on the emissivity, of less than about 1%; about 2% to about 5%; about 25% to about 50%; about 28.5% to about 47%; about 30% to about 45%; about 28.5%; about 47%; about 55%; up to about 70%; and up to about 75%.

Electrochemical impedance spectroscopy (EIS) is well known to one of ordinary skill in the art and has been applied to the study of corrosion for many years and is an accurate method of measuring corrosion rates. As used herein, it is used to measure the resistance of the film composite to corrosion under the influence of the Chloride ion of NaCl solutions. A high impedance value (measured in M Ohms) means less corrosion. The composite films of the current disclosure have an impedance values of about 3.0 M Ohms to about 13.8 M Ohms; about 5.0 M Ohms to about 13.8 M Ohms; about 5.0 M Ohms to about 8.0 M Ohms; about 3.0 M Ohms to about 6.2 M Ohms.

Corrosion can also be measured with salt spray testing, which provides a controlled corrosive environment which is commonly utilized to produce relative corrosion resistance information for specimens of metals and coated metals exposed in a given test chamber. This test is performed in accordance with ATSM B117-09. After 1000 and 2000 hours, the composite film samples are then measured for corrosion by photography and image analysis. The level of corrosion is based on the following scale: 1=no corrosion; 2=very light corrosion; 3=light corrosion; 4=moderate corrosion; and 5=heavily corroded. The composite films disclosed herein showed no corrosion or very light corrosion.

The corrosion of the composite films can also be measured with a salt water exposure test. The composite films are sprayed with a salt solution, taped to the lid of a box of water, and aged in a 50° C. oven for several days. After 4, 7, and 10 days of aging, the samples were rinsed with tap water and examined for corrosion. The scale above for the salt spray testing was also applied to these samples. After 4 days of aging, the composite films had no corrosion (1). After 7 days of aging, the composite films had very light to no corrosion. Finally, after 10 days of aging, the composite films had very light to light corrosion.

The Taber Abrasion Test is a commonly utilized test for window films and other films for glazing or display applications. This test uses a Taber Abrader in accordance with ASTM D 1044 using CS-T3 wheels each loaded to 500 grams. As the wheels scratch and grind the surface, the films become more hazy. Thus, the delta haze is the measure of change in haziness of a film after being subjected to the abrasion of the wheel. The results are quoted in delta haze value after 100 cycles of the wheel. For example, a polyester film will generally have a delta haze of about greater than 30%. The composite films, and specifically the underlayers, of the current disclosure have an abrasion delta haze of less than about 5%; about 3% to about 5%; and about 4.1%.

The Alcohol Abrasion Test (termed "Crock Test") utilizes an SDL Atlas Crock Meter type M238BB. Pure (100%) Isopropyl Alcohol (IPA) was chosen as the testing cleaner fluid. A mechanical arm with a removable cloth end is placed in contact with a sample film. The cloth is soaked in IPA and cycled back and forth repeatedly. The results are subjective and the product is viewed for abrasion damage or breakthrough to the IR reflective layer(s) after 50 cycle intervals. The level of abrasion is based on the following scale: 1=no breakthrough; 2=very light breakthrough; 3=slight breakthrough; 4=50% breakthrough; and 5=greater than 50% breakthrough. The composite films disclosed herein advantageously showed slight, very slight, and no breakthrough.

The adhesion test was in accordance with ASTM D 3359. Tape (3M 810 and 600 tape) was pressed onto the sample surfaces and left for approximately 10 seconds and then pulled off at a 180° angle. The samples were not cleaned or marked prior to testing. Samples of hardcoat were evaluated on a pass/fail determination.

The EMI shielding strength was evaluated according to ASTM D-4935, via a far field type test using a coaxial TEM cell. The test measures the ability of the product to block electromagnetic radiation. The results are reported in decibels (dB), as are well known and commonly used. The more negative the value of decibels, the more electromagnetic radiation that is blocked. The composite films of the current disclosure have a shielding efficiency of about −23 dB (which corresponds to approximately 99.5% of blocked electromagnetic radiation) and about −31 dB (which corresponds to approximately 99.9% of blocked electromagnetic radiation). Stated differently, the composite films of the current disclosure can block up to about 99.9% of electromagnetic radiation and up to about 99.5% of electromagnetic radiation.

With reference to FIG. 1, there is shown an embodiment of a composite film (10) comprising a transparent polymeric film substrate (11) coated on one side with an underlayer (12). The underlayer (12) is covered with an IR reflective layer (20). Although by no means necessary, the IR reflective layer (20) may additionally be covered by a protective top coat (13). As noted above, the bottom of the composite film (10) would be the side of the substrate without the underlayer (12) and the top of the composite film (10) would be the side exposed.

When used as an exterior or interior window film, or as insulation attached to a wall, the substrate (11) may additionally have provided on its bottom a means for adhering the substrate to a window. As shown in FIG. 1 for example, the composite (10) has an adhesive layer (14) provided on the substrate (11). The adhesive layer (14) can be comprised of any adhesive that is suitable for bonding the substrate (11) to a window, wall or any other substrate. When being bonded to a window, pressure sensitive adhesives are preferable, with an acrylic based adhesive being particularly preferable. Gelva 263 (available from Cytec Industries) is an example of such an adhesive. The adhesive layer (14) may also have a release liner (15) attached thereto. The release liner (15) advantageously provides a release effect against the sticky adhesive layer (14). The release liner (15) in the depicted embodiment can comprise any polyethylene terephthalate (PET) film with a silicone release coating that can be peeled from the adhesive layer (14) leaving the adhesive layer (14) on the base substrate (11). Alternatively, the adhesive and release layers may comprise a clear distortion free adhesive with a polypropylene liner.

The transparent film substrate (11) is comprised of a flexible, transparent, polyester film. The substrate (11) is preferably a polyethylene terephthalate (PET) or polyethylene naphthalate (PEN) film about 2 mil (0.05 mm) in thickness. Although by no means necessary, the PET or PEN film may be treated with a UV absorber so as to absorb up to 99% of UV radiation. An example of such an ultraviolet (UV) absorber film is described in U.S. Pat. No. 6,221,112, the entire disclosure of which is hereby incorporated by reference. Melinex® 454 or ST505 polyester films (available from DuPont Teijin Films, "DuPont") are examples of such preferred films. Additionally, the film may have been surface treated with chemicals to improve adhesion thereto.

The underlayer (12) supplies an intermediate layer between and is bond together with, the underlying substrate (11) and the overlying IR reflective layer (20), improving the robustness, hardness, and durability of these underlying and overlying optical layers (i.e., the composite film (10)). Additionally, the IR reflective layer (20) often includes metals that are prone to atmospheric corrosion; however, the underlayer (12) provides a high level of durability in terms of resistance to cracking even though the underlayer (12) does not cover the IR reflective layer (20). As a result, the composite film (10) has increased mechanical strength and greater resistance to abrasion, cracking, and scratching without negatively impacting the emissivity. Stated differently, the underlayer (12) protects the metallic IR reflective layer (20) from susceptibility to abrasion and scratching. The underlayers of the current disclosure have an abrasion delta haze of less than about 5%; about 3% to about 5%; and about 4.1%.

The underlayer (12) can be comprised of any hardcoat, as that term is readily understood by one of ordinary skill, that is compatible with the substrate (11) and able to be applied to the surface thereof through conventional roll-to-roll coating. Examples of such hardcoats, include, but are not limited to, highly crosslinked polymer coatings, thermally cured acrylate coatings, thermally cured sol gel coatings based on silicates, titanates, zirconates, or mixtures thereof, hybrid organic-inorganic sol gel materials (for example, Ormocer® polymers available from Fraunhofer), and thermally cured siloxane hardcoats. The thermal curing of the hardcoat, if applicable, can occur by heat, such as in an oven, or by NIR heating.

A preferred underlayer (12) is a UV cured polyacrylate composition without nanoparticles. A particularly preferred underlayer (12) is a UV cured polyacrylate composition containing nanoparticles and comprised of the following: acrylic based resin, metal oxide nanoparticles, crosslinking agent, photoinitiator, solvent, and surfactant. As discussed more fully below, not all of these are necessary constituents of the composition. Additionally, the compositions below discuss weight percentages based on the inclusion of the solvent. The solvent is merely added to aid in the application of the wet underlayer (12) to the substrate (11) and, the solvent evaporates upon drying. Thus, as one of ordinary skill in the art would readily appreciate, the below described weight percentages of the acrylics and nanoparticles, for example, could vary depending on the amount and type of solvent included in the wet underlayer (12) composition.

The acrylic based resin may include diacrylates such as hexanediol diacrylate, tricyclodecane dimethanol diacrylate (available as Sartomer SR833 from Sartomer LLC), and dioxane glycol diacrylate (available as Sartomer CD536 from Sartomer LLC) or a mixture of diacrylates. Other suitable acrylic based resins are urethane aliphatic acrylates (Ebecryl® 8301). The underlayer (12) preferably comprises about 10 to about 60 weight percent (wt %) acrylic based resin. As noted above, these weight percentages include the addition of the solvent discussed below. Thus, in a final, dried form, the underlayer (12) could comprise about 40 wt % to about 99 wt % acrylic based resin.

The metal oxide nanoparticle fillers are typically silicon dioxide ($SiO_2$) and aluminum oxide ($Al_2O_3$). These nanoparticles are by no means necessary; however, the addition of the nanoparticles to the underlayer (12) improves the mechanical and physical properties of the composite film (10). Specifically, the nanoparticles increase the hardness and flexural modulus of the underlayer (12) and composite film (10). The nanoparticles are distributed in a controlled manner to also provide a level of fine surface roughness to the composite film (10). This surface roughness reduces blocking, assists in roll handling, and improves adhesion to the IR reflective layer (20). Additionally, because the nanoparticles are very small (typically 50 nm or less average particle size), they have low haze and absorption and thus do not have any significant deleterious effect on the clarity or transmission properties of the composite film.

$SiO_2$ nanoparticles are particularly preferable. They are added in the form of dispersions of nanoparticles in the acrylate monomers and/or urethane acrylate monomers and are available from a number of suppliers. Examples of these nanoparticles include Nanocryl® C140 and XP21/2135 (available from Hanse Chemie), Highlink® NanO-G 103-53 (available from Clariant Corp.), FCS100 (available from Momentive Performance Materials), and Ebecryl® 8311 (available from Cytec Industries). These nanoparticles generally have a particle size of 0.1 microns or less. The nanoparticles remain stably dispersed during film forming, drying, and UV curing and do not make any significant contribution to haze or reduction in gloss. The underlayer (12) could comprise 0 wt % to about 65 wt %, and preferably about 21 wt %. Again, in a final, dried form, after the evaporation of the solvent, the underlayer (12) could comprise different amounts of nanoparticles, for example, preferably about 43 wt %.

The crosslinking agent induces the formation of covalent chemical bonds between the polymer chains of the acrylic based resin via crosslinking of molecules or groups when the mixture is subject to UV or EB radiation. The crosslinking turns the mixture into a more solidified state, provides the underlayer (12) with the high mechanical strength and abrasion resistance, and improves adhesion to the IR reflective layer (20). Cross linking agents may include pentaerythritol tetraacrylates and triacrylates and mixtures thereof, or suitable urethane acrylates. The underlayer (12) in wet form (i.e., with solvent) preferably comprises about 16 wt % to about 40 wt % crosslinking agent and more preferably about 21 wt % crosslinking agent.

The photoinitiator is used to promote the polymerization reaction and to aid in forming the hardness of the underlayer (12). Any suitable photoinitiator known to one of ordinary skill in the art may be used, including, but not limited to azobisisobutyronitrile and benzoyl peroxide. Examples of photoinitiators are Irgacure® 184 and Irgacure® 907 (available from Ciba Specialty Chemicals). The underlayer (12) preferably comprises about 2 wt % to about 7 wt % photoinitiator, about 2 wt % to about 3.5 wt %, and more preferably about 3.5 wt % photoinitiator.

The solvent is added to thin the composition and to form a solution that can be more easily applied to the substrate (11). After drying, the solvent evaporates from the solution such that the final dried underlayer (12) may comprise little to no solvent. Suitable solvents include, but are not limited to, n-butyl acetate, isopropyl alcohol, and MEK (methylethyl ketone). The underlayer (12) preferably comprises about 10 wt % to about 50 wt % solvent, and more preferably about 25 wt % solvent.

Many surfactants are possible, including those commonly used in coating formulations for leveling on a film substrate. Suitable surfactants include, but are not limited to: Ebecryl® 1360 (available from Cytec Industries); Byk 3570, Byk UV-3530, and Byk UV-3500 (available from Byk Chemie); and Tego Wet 270 and Tego Glide 432 (available from Evonik Industries). The underlayer (12) preferably comprises about 0.1 wt % to about 0.2 wt % surfactant, and more preferably about 0.11 wt % surfactant.

The above ingredients for the underlayer (12) composition are mixed together for coating the substrate (11) to a wet film thickness of about 3 to about 6 microns using any suitable process known to one of ordinary skill which coats evenly and levels smoothly, such as a reverse gravure process. After application to the substrate (11), the coating is dried in an oven and UV cured under lamps at a line speed of about 80 ft per minute. The final cured, dried underlayer (12) has a thickness of about 1.5 microns to about 6 microns; more preferably about 2 microns to about 5 microns; and most preferably about 2.5 microns. If the underlayer (12) is too thin, the composite film (10) would not have the desired mechanical durability, hardness, or abrasion resistance, nor would the composite film (10) be able to withstand the typical stresses of installation and lifetime use.

The IR reflective layer (20) overlays the underlayer (12) and may be applied to the underlayer (12) by sputtering, as that process is well understood by one ordinary skill in the art, or any suitable deposition application, including, for example, evaporation or any chemical or physical deposition. The IR reflective layer (20) may be comprised of any transparent metal layer(s) that is highly reflective in the IR range. In the embodiment in FIG. 1, the IR reflective layer (20) is a core layer (16) comprised of a metallic layer selected from the group consisting of aluminum, copper, nickel, gold, silver, platinum, palladium, tungsten, titanium, or an alloy thereof. Gold and silver and alloys thereof are generally preferred. As discussed more fully below, the types and amounts of metal and metal alloys in the IR reflective layer can be manipulated to achieve the desired emissivity and VLT. For example, tungsten and titanium are more highly absorptive of light than silver and gold and thus would be most useful for embodiments with lower VLT.

Figure 2:
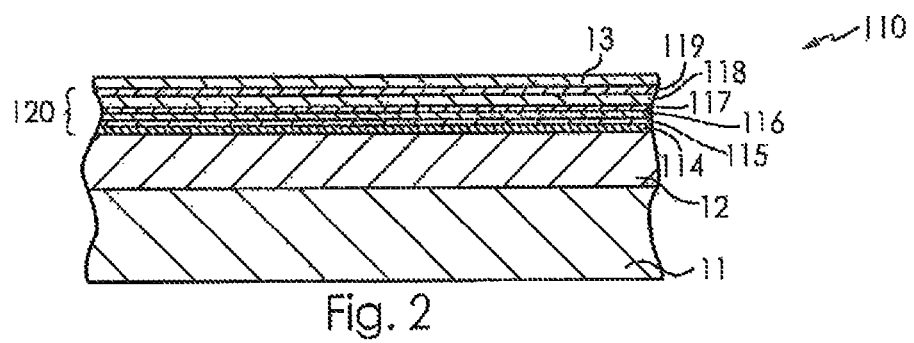
FIG. 2 is a cross-sectional view of another embodiment of a low emissivity and EMI shielding window film which includes a protective top coat.
Figure 3:
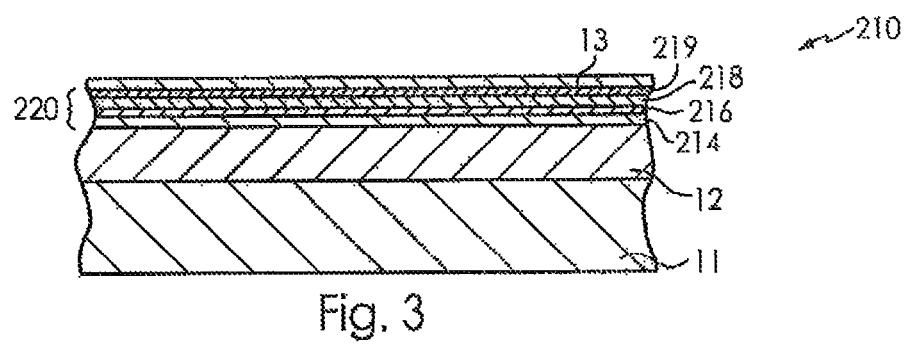
FIG. 3 is a cross-sectional view of another embodiment of a low emissivity and EMI shielding window film which includes a protective top coat.
Figure 4:
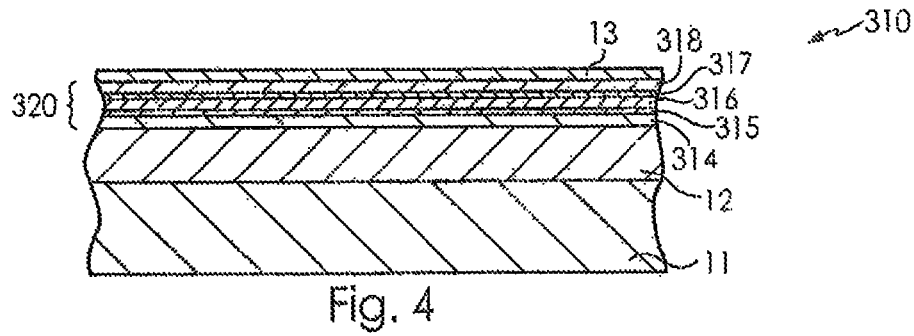
FIG. 4 is a cross-sectional view of another embodiment of a low emissivity and EMI shielding window film which includes a protective top coat.

Additionally, as would be readily appreciated by those of ordinary skill in the art, the layer reflecting the IR, the IR reflective layer (20) in FIG. 1, may be comprised of either a single layer of metal or conductive metal oxide or a multi-layer stack of metal, metal oxide, and/or other optical layers, whether comprised of metal or otherwise. For example, transparent conductive layers or dielectrics layers can be used in conjunction with a core metallic layer to control the IR light reflection and VLT and protect the core metallic layer against corrosion. Any transparent conductive layer, as that term is understood in the art, would be suitable, including, but not limited to, Indium Zinc Oxide (IZO), Indium Tin Oxide (ITO), Antimony Tin Oxide (ATO), indium oxide, zinc oxide, tin oxide, and other metal oxides, or mixtures thereof. Many of these transparent conductive layers could also be used as a dielectric layer, as that term is understood in the art, if sufficiently thin. In this regard, any dielectric which is transparent to visible light is suitable, including, but not limited to, IZO, ITO, silicon dioxide, aluminum oxide, silicon nitride, or mixtures thereof. When a particular layer is comprised of a transparent conductive layer, dielectric layer, or mixtures thereof, it is referred to herein as a "spacer layer." Examples of embodiments with the above described multi-layer stacks are shown in FIGS. 2-4 and discussed more fully below.

Hard ceramics such as silicon oxynitride (SiOxNy) and aluminum oxynitride (AlOxNy) could also be added to improve the mechanical and physical properties of the film (10) without adverse effects on the thermal and optical performance. Alternatively, thicker layer ceramics and/or metal oxides could also be applied in conjunction with or as part of the IR reflective layer (20) to create a particular color or level of reflection, but because these layers are likely to be more absorptive, they could reduce the level of heat retention in cold climates. In this regard, the types, amounts, and thicknesses of the layers of metal, metal alloys, metal oxides, and hard ceramics can be manipulated to achieve the desired emissivity, VLT, mechanical strength, and visual appearance.

The protective top coat (13) is transparent and seals the surface of the sputtered IR reflective layer(s) (20) and should be very thin (for example, less than 0.5 microns), such that there is no significant effect on the composite emissivity. In this regard, the protective top coat (13) does not contribute to the hardness of the composite film (10) for resistance to scratching.

This protective top coat (13) is by no means necessary to achieve desirable levels of emissivity, VLT, and abrasion resistance, as one of ordinary skill in the art would readily appreciate. However, the protective top coat (13) provides other added benefits to the composite film (10). For example, the top coat (13) prevents the ingress of contaminants, including, but not limited to, atmospheric contaminants such as gaseous sulphur compounds in polluted areas and chloride ions from fingerprints. Without the addition of the top coat (13), these contaminants could harm the physical and/or mechanical properties of the composite film (10). The top coat (13) also acts as a chemical barrier for the underlying IR reflective layer(s) and thereby may reduce corrosion and allow abrasives to slide over the surface without causing scratches. Additionally, in some embodiments, the top coat (13) may have low surface energy and friction which aids in the installation and cleaning of the composite film (10). Specifically, squeegees or other installation or cleaning devices are able to move more easily over the surface composite film (10).

The benefits of the protective top coat (13) described above can be achieved without significantly affecting the emissivity of the composite film (10) because the underlayer (12) additionally provides many of these benefits previously required of the protective hardcoat (e.g., abrasion resistance) and thus allows for the use of an extremely thin protective layer. Other benefits not mentioned herein would be readily recognized by one of ordinary skill in the art.

The protective top coat (13) will generally comprise silicon in some form, including, but not limited to, polysilazane, fluoroalkyl silane, and fluoro silane. The protective top coat (13) could comprise, for example, about 7 wt % to about 8 wt % polysilazane. An example of such a polysilazane is G-Shield™ (available from KiON Specialty Polymers). Alternatively, the protective top coat (13) could be comprised of either fluoroalkyl silane or fluorosilane in the following ranges: about 0.5 wt % to about 1.5 wt %; less about 0.5 wt %; and less about 1.50 wt %. Examples of such fluoroalkyl silanes or fluorosilanes are, respectively, Dynasylan® F8261 (available from Evonik Industries) and Fluorolink® S10 (available from Solvay Solexis Spa of Italy). The protective top coat (13) could additionally comprise solvents, photo-acid catalysts, photoinitiators, and other additives such as repellants (e.g., Sivo® Clear available from Silanex AB).

Silicon based compounds, however, are by no means necessary, as one of ordinary skill in the art would readily recognize Instead, the protective top coat (13) is merely designed to treat the surface for the film and to provide the above described benefits without a significant effect on emissivity. For example, finishes used for treating the surface of glass, such as wax type coatings, and fluorocarbons used for soil release may also be utilized.

One preferred protective top coat (13) is a UV or EB cured fluorinated resin comprised of about 1.0 parts fluorosilane resin, about 0.5 to about 1.5 parts photoinitiator, and about 97 to about 99 parts solvent, where the parts are parts by weight.

The solvent is added to thin the composition and to form a solution that can be more easily applied to the IR reflective layer (20). After drying, the solvent evaporates from the solution such that the final dried protective top coat (13) may comprise little to no solvent. Suitable solvents include, but are not limited to, isopropyl alcohol (IPA), glycol ether, butyl acetate, xylene, water, and any mixtures thereof. The composition can contain one or more of these solvents. Suitable fluorosilanes include, but are not limited to, fluoro alkyl silanes. An example of such a fluorosilane is a dispersion of Fluorolink® S10 (available from Solvay Solexis Spa of Italy). Preferred photoinitiators include Cyracure™ 6976 (available from Dow Chemicals) and Chivacure® 1176 (available from Chitech).

A particularly preferred top coat composition comprises about 70 wt % IPA, about 20 wt % glycol ether, about 5.9 wt % water, about 1.48 wt % fluorosilane dispersion, and about 1.48 wt % photoinitiator. It should be noted that when preferred compositions are discussed herein, the total composition may be greater than or less than 100 wt %. As one of ordinary skill in the art would readily recognize, this is merely a reflection of the fact that the weight percents given are not exact and may be rounded to reflect an approximate (or "about") weight percent. Additionally, as noted above, the weight percentages discussed herein could vary depending on the amount and type of solvent added, as one of ordinary skill in the art would readily appreciate.

The above ingredients for the protective top coat (13) composition are mixed together for coating the IR reflective layer(s) (20) to a wet film thickness of about 1 micron to about 3 microns using any suitable process known to one of ordinary skill which coats evenly and levels smoothly, such as, but not limited to, a reverse gravure process. After application to the PET film, the coating is dried in an oven at a temperature of about 80° C. to about 110° C. for 5 to 20 seconds. The protective top coat (13) is then UV cured at a running speed of about 20 to 30 meters per second. The final cured, dried protective top coat (13) has a thickness of less than about 0.5 microns and preferably about 0.05 microns.

With reference now to FIG. 2, the composite (110) is substantially the same as the composite (10) excepting that the IR reflecting layer (120) is a multi-layer stack. In a preferred embodiment, the IR reflecting layer (120) can comprise at least one core layer (116). The core layer (116) may be comprised of any metal that is highly reflective in the IR range, including, but not limited to, a metallic layer selected from the group consisting of aluminum, copper, nickel, gold, silver, platinum, palladium, tungsten, titanium, or any alloy thereof. In a preferred embodiment, the core layer (116) is a gold-silver alloy having between about 7 nm and about 35 nm in thickness, depending upon the required emissivity of the film (110). However, other metals or alloys discussed above would also be suitable in this embodiment.

The IR reflecting layer (120) can also comprise a silicon based layer (114) adjacent and aiding in adhesion to the underlayer (12). The silicon based layer (114) can be comprised of silicon nitride, silicon oxide, or silicon oxynitride layer, preferably a silicon nitride, and having between about 1 nm and about 25 nm in thickness. The silicon based layer (114) is covered by a thin metal film (115) having between about 1 nm to about 5 nm in thickness. This thin metal film (115) serves to protect the core layer (116) and can be comprised of any metal selected from the group consisting of nickel, chromium, niobium, gold, platinum, cobalt, zinc, molybdenum, zirconium, vanadium, and alloys thereof. A nickel-chromium alloy is particularly preferred, such as Hastelloy™ (available from Haynes International) or Inconel™ (available from Special Metals Co.) and as described in U.S. Pat. No. 6,859,310, the entire disclosure of which is hereby incorporated by reference.

The IR reflective layer (116) is then covered by a second thin metal film (117), preferably nickel-chromium alloy, and having between about 1 nm to about 5 nm in thickness. The second thin metal film (117) is in turn covered by a spacer layer (118) having between about 40 and about 80 nm in thickness. As noted above, the spacer layer is comprised of any transparent conductive layer, dielectric layer, or combinations thereof. The spacer layer (118) is preferably a transparent conductive layer comprised of ITO. The spacer layer (118) is then covered by a second silicon based layer (119) formed from one of silicon nitride, silicon oxide, or silicon oxynitride and having between about 1 to about 25 nm in thickness. This silicon based layer (119) is then coated with the protective top layer (13). The layers ((114) to (119)) are formed by sputtering as is well known in the art.

With reference now to FIG. 3, the composite film (210) is substantially the same as the composite (10) excepting that the IR reflecting layer (220) is a multi-layer stack comprised of a core layer (216) encased in a multi-layer stack and sandwiched between two spacer layers ((214) and (218)), comprised of any transparent conductive layer, dielectric layer, or combinations thereof, as described above. The IR reflecting layer (220) is made up of a first spacer layer (214) adjacent to the underlayer (12) and having about 45 nm in thickness. The first spacer layer (214) is then covered by a core layer (216) having about 12 nm in thickness depending upon the required emissivity of the composite film (210). Again, the core layer (216) may be comprised of any metal that is highly reflective in the IR range, including, but not limited to, a metallic layer selected from the group consisting of aluminum, copper, nickel, gold, silver, platinum, palladium, tungsten, titanium, or any alloy thereof. In this embodiment, the core layer (216) is preferably pure gold or a gold alloy where gold is the major constituent. The core layer (216) is then covered by a second spacer layer (218) having about 35 nm in thickness, which is in turn covered by silicon based layer (219) having 10 nm in thickness and comprising silicon nitride or silicon aluminum nitride. The layers ((214), (216), (218), and (219)) are formed, for example, by sputtering. The silicon based layer (219) is then coated with the protective top coat (13).

With reference now to FIG. 4, the composite (310) is substantially the same as the composite (10) excepting that the IR reflecting layer (320) is now provided by a multi-layer stack comprised of a plurality of transparent conductive layers ((314), (316), and (318)) which serve as IR reflectors and are preferably comprised of IZO, interleaved by thin metal oxide layers ((315) and (317)), which introduces flexibility to the composite (310). The thin metal oxide layers ((315) and (316)) are preferably, but by no means necessarily, comprised of nickel-chromium oxide. For example, the thin metal oxide layers ((315) and (316)) could alternatively be comprised of a spacer layer, as that term is defined above. The IR reflecting layer (320) is located over the underlayer (12) and may be provided with a protective top coat (13).

Preferably, the infrared reflective layer includes a plurality of thin spacer layers disposed between a plurality of transparent conductive layers wherein there is one more transparent conductive layer than spacer layer. This arrangement, however, is by no means necessary. The number of transparent conductive layers and spacer layers (or thin metal oxide layers) may be varied depending upon the required flexibility of the IR reflecting layer (320) and the total thickness of the transparent conductive layers in the IR reflecting layer (320) will generally determine the emissivity, with the total thickness of the transparent conductive layers generally being above about 200 nm. In any event, the total thickness of transparent conductive layers and interleaving spacer layers should preferably not exceed 260 nm in thickness, although this is by no means necessary, as one of ordinary skill in the art would readily appreciate.

In one embodiment, the IR reflecting layer (320) is made up of a first transparent conducting layer (314) adjacent to the underlayer (12) and having about 65 nm, a first thin metal oxide layer (315) having about 5 nm in thickness and covering the first transparent conducting layer (314), a second transparent conducting layer (316) having about 65 nm in thickness and covering the first thin metal oxide layer (315), a second thin metal oxide layer (317) having about 5 nm in thickness and covering the second transparent conducting layer (316), and a third transparent conducting layer (318) which is optionally coated with the protective layer (13). The layers ((314)-(318)) are formed by sputtering as is well known in the art.

Composite films as shown in FIGS. 1-4 may be utilized on the interior or exterior of window glazings including vehicles and buildings. The composite films may be used with single pane windows or with dual or triple pane windows and will improve the U-Factor of a window. The U-Factor measures the rate of heat transfer or loss through a window as laid down by the National Fenestration Rating Council. Additionally, any and all embodiments of the composite films may be provided with or without the adhesive layer and release liner.

The embodiments described above provide an improved low emissivity composite combining the desirable properties of exceptionally low emissivity with abrasion and scratch resistance. For example, embodiments disclosed herein have a VLT between about 28.5% and about 47% with a very low emissivity of about 0.1 or less. Such an embodiment may be desirable in warmer sunny climates. Another embodiment disclosed herein may have a higher VLT, up to about 75% for example, with an emissivity of about 0.20 or less. Such an embodiment may desirable, for example, in cooler, northern climates. Additionally, the embodiments described above effectively reduced EMI. For example, embodiments disclosed herein have an EMI shielding value of about −23 dB and about −31 dB.

The presently described composite films will now be described with reference to the following non-limiting examples.

Examples 1-2

Composite films "Sample A" and "Sample B" were constructed in accordance with FIG. 2 and as described above with the following layers and thicknesses shown in Table 1.

TABLE 1

| Layer (Referenced to FIG. 2) | Layer Terminology | Composition | Sample A Thickness | Sample B Thickness |
|---|---|---|---|---|
| 11 | Transparent Film Substrate | Polyethylene terephthalate (PET) | 2 mil | 2 mil |
| 12 | Underlayer | UV cured polyacrylate composition containing metal oxide nanoparticles | 2.5 microns | 2.5 microns |
| 114 | Silicon Based Layer | Silicon nitride | 15 nm | 15 nm |
| 115 | Thin Metal Film | Nickel-chromium (Ni—Cr) | 2 nm | 2 nm |
| 116 | Core Layer | Silver-gold alloy (Ag—Au) | 15 nm | 25 nm |
| 117 | Second Thin Metal Film | Ni—Cr | 2 nm | 2 nm |
| 118 | Spacer Layer | Indium Tin Oxide (ITO) | 55 nm | 60 nm |
| 119 | Second Silicon Based Layer | Silicon nitride | 10 nm | 15 nm |
| 13 | Protective Top Coat | UV cured fluorosilane composition | 0.05 microns | 0.05 microns |

Samples A and B were then tested for optical and physical properties according to the above testing methods. The results are given below in Table 2.

TABLE 2

| | Sample A | Sample B |
|---|---|---|
| VLT | 47% | 28.5% |
| Emissivity | 0.10 | 0.07 |
| Total Solar Energy Rejection (TSER) | 66% | 79% |
| Absorption | 19% | 21% |
| Reflection of visible light from front top coat (% R) | 37% | 62% |
| Reflection of visible light from rear PET face (% R) | 20% | 56% |
| Total Solar Transmission | 14% | 18% |
| Solar Energy Reflected Externally | 50% | 62% |
| Solar Energy Reflected Internally | 53% | 56% |

TABLE 2-continued

| | Sample A | Sample B |
|---|---|---|
| Adhesion | Pass | Pass |
| Crock Test | 1 | 1 |
| EMI Shielding | N/A | −31 dB |

Examples 3-5

Sample A was also tested for comparison with various similar samples. Sample A is designed as described above in Example 1 with an untreated PET film layer. Sample C provides for the same stack design as Sample A, except that the PET film is treated and the underlayer was omitted. Sample D provides for the same stack design as Sample A (with an untreated PET film layer), except that the underlayer was omitted. Sample E provides for the same stack design as Sample A, except that the protective top coat was removed. The test results are shown below in Table 3.

TABLE 3

| | Sample A | Sample C | Sample D | Sample E |
|---|---|---|---|---|
| Crock Test | Pass | Fail | Fail | 5% Removal |
| Tape Adhesion | Pass | Pass | Pass | Fail |
| Taber (Δ Haze %) | 3.0-5.0 | — | — | — |
| EIS (Impedance in M Ohms) | 3.0-6.2 | — | — | — |

The results in Table 3 demonstrate that without the supporting underlayer, the composite samples fail the Crock Test. Surprisingly, the presence of the abrasion resistant underlayer affects the resistance of the protective top coat and IR reflective layers to damage.

Examples 6-7

Composite films "Sample F" and "Sample G" were constructed in accordance with FIG. 3 and FIG. 4, respectively, and as described above with the following layers and thicknesses shown in Tables 4-5.

TABLE 4

| Layer (Referenced to FIG. 3) | Layer Terminology | Composition | Sample F Thickness | |
|---|---|---|---|---|
| 11 | Transparent Film Substrate | Polyethylene terephthalate (PET) | 2 | mil |
| 12 | Underlayer | UV cured polyacrylate composition containing metal oxide nanoparticles | 2.5 | microns |
| 214 | First Spacer Layer | Indium Zinc Oxide (IZO) | 45 | nm |
| 216 | Core Layer | Gold or gold alloy where gold is the major constituent | 12 | nm |
| 218 | Second Spacer Layer | IZO | 35 | nm |
| 219 | Silicon Base Layer | Silicon nitride or silicon aluminum nitride | 10 | nm |
| 13 | Protective Top Coat | UV cured fluorosilane composition | 0.05 | microns |

TABLE 5

| Layer (Referenced to FIG. 4) | Layer Terminology | Composition | Sample G Thickness | |
|---|---|---|---|---|
| 11 | Transparent Film Substrate | Polyethylene terephthalate (PET) | 2 | mil |
| 12 | Underlayer | UV cured polyacrylate composition containing metal oxide nanoparticles | 2.5 | microns |
| 314 | First Transparent Conductive Layer | Indium Zinc Oxide (IZO) | 65 | nm |
| 315 | First Thin Metal Oxide Layer | Nickel-Chromium Oxide | 5 | nm |
| 316 | Second Transparent Conductive Layer | IZO | 65 | nm |
| 317 | Second Thin Metal Oxide Layer | Nickel-Chromium Oxide | 5 | nm |
| 318 | Third Transparent Conductive Layer | IZO | 65 | nm |
| 13 | Protective Top Coat | UV cured fluorosilane composition | 0.05 | microns |

Samples F and G were then tested for optical and physical properties according to the above testing methods. The results are given below in Table 6.

TABLE 6

| | Sample F | Sample G |
|---|---|---|
| VLT | 70% | 75% |
| Emissivity | 0.08 | 0.17 |
| Total Solar Energy Rejection (TSER) | 50% | 27% |
| EMI Shielding | −23 dB | N/A |

Examples 8-13

Protective top coats "Sample H," "Sample I," "Sample J," "Sample K," "Sample L," and "Sample M" were constructed in accordance with the descriptions above with the following compositions (based on weight percentages) as shown in Table 7.

TABLE 7

| Generic Description | Top Coat Formulation | Sample H | Sample I | Sample J | Sample K | Sample L | Sample M |
|---|---|---|---|---|---|---|---|
| Solvent | IPA | 97 | 38 | 99 | 97 | — | 36 |
| Solvent | Glycol Ether PM | — | 60 | — | — | — | 36 |
| Solvent | Butyl Acetate | — | — | — | — | 93 | — |
| Solvent | Xylene | — | — | — | — | — | 4.7 |
| Solvent | DI H$_2$O | 2 | 1.8 | — | 2 | — | — |
| Polysilazane | G-Shield ® | — | — | — | — | 7.4 | — |
| Fluoroalkyl Bifunctional Silane | Dynasylan ® F8261 | — | — | — | — | 0.53 | — |
| Fluoro Silane | Flurolink ® S10 | 0.52 | 0.44 | 0.54 | — | — | 0.26 |
| Repellant | Sivo Clear ® K1 | — | — | — | — | — | 12 |
| Repellant | Sivo Clear ® K2 | — | — | — | — | — | 12 |
| Photoinitiator | Cyracure ™ | 0.52 | — | — | — | — | — |

Samples H-M were then tested for optical and physical properties according to the above testing methods. The results are given below in Table 8.

TABLE 8

| Testing Method | Parameters | Sample H | Sample I | Sample J | Sample K | Sample L | Sample M |
|---|---|---|---|---|---|---|---|
| Salt Spray Testing (based on 50 square centimeter testing area) | After 1000 hours | 1 | 1 | 1 | 1 | 1 | 1 |
| | After 2000 hours | 4 | 1 | 1 | 1 | 3 | 1.5 |
| EIS Equivalent Circuit | M Ohms | 10 | 7.5 | 5 | 8 | 7.5 | 13.8 |
| Salt Water Exposure Test | After 4 days | 1 | 1 | 1 | 1 | 1 | 1 |
| | After 7 days | 1 | 1 | 1 | 1 | 2 | 1 |
| | After 10 days | 2 | 3 | 3 | 3 | 2 | 3 |

As noted above, the level of corrosion for the Salt Spray Testing and the Salt Water Exposure is based on the following scale: 1=no corrosion; 2=very light corrosion; 3=light corrosion; 4=moderate corrosion; and 5=heavily corroded.

Examples 13-18

Underlayers "Sample N," "Sample O," "Sample P," "Sample Q," "Sample R," and "Sample S" were constructed in accordance with the descriptions above with the following compositions (based on weight percentages) as shown in Table 9.

TABLE 9

| Generic Description | Top Coat Formulation | Sample N | Sample O | Sample P | Sample Q | Sample R | Sample S |
|---|---|---|---|---|---|---|---|
| Solvent | n-Butyl Acetate | 25 | 25 | 25 | 25 | 25 | 25 |
| Photoinitiator | Irgacure ® 184 | 2.80 | 1.67 | 2.85 | 2.85 | 2.85 | 1.67 |
| Photoinitiator | Irgacure ® 907 | 0.70 | 0.33 | 0.71 | 0.71 | 0.71 | 0.33 |
| Resin | SR833 | 17.5 | 7.2 | 10.7 | 10.7 | 10.7 | 9.1 |
| Resin | Ebecryl ® 8301 | 23 | — | — | — | — | 25 |
| Mercapto Propionate | TMPMP | — | 3.6 | — | — | — | 3.6 |
| Surfactant | 50% Byk 3570 | 0.14 | 0.22 | 0.21 | 0.21 | 0.21 | 0.22 |
| Nanoparticle | Ebecryl ® 8311 | — | 43 | 43 | 25 | 43 | — |
| Nanoparticle | Nanocryl ® C140 | — | — | — | — | 18 | 25 |
| Nanoparticle | FCS100 | — | 18 | 18 | 18 | — | — |
| Nanoparticle | XP 21/2135 | — | — | — | 18 | — | 9 |
| Nanoparticle | Highlink ® NanO-G 103-53 | 32 | — | — | — | — | — |

Samples N-S were then formed with the IR reflective layer(s) as described above and with the above methods. Additionally, Samples N-S were then prepared with and without the protective top coat (Sample H) were then tested for abrasion resistant according to the above described Crock testing methods. The results are given below in Table 10.

TABLE 10

| | Sample N | Sample O | Sample P | Sample Q | Sample R | Sample S |
|---|---|---|---|---|---|---|
| Abrasion Without Protective Top Coat | 4 | 3 | 5 | 4 | 2 | 2 |
| Abrasion With Protective Top Coat (Sample H) | 2 | 2 | 3 | 4 | 1 | 1 |

As noted above, the level of abrasion is based on the following scale: 1=no breakthrough; 2=very light breakthrough; 3=slight breakthrough; 4=50% breakthrough; and 5=greater than 50% breakthrough. The above results demonstrate that the underlayer alone, without a protective top coat, can provide sufficient, very light abrasion resistance. Additionally, the results demonstrate that the protective top coats of the current disclosure can provide a certain added level of abrasion resistance.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. Further, ranges provided for a genus or a category, such as dielectric metal oxides, can also be applied to species within the genus or members of the category, such as IZO, unless otherwise noted.

The invention claimed is:

1. A method for selectively reducing emissivity through a surface, the method comprising:
   providing a low emissivity composite film, comprising:
   a film substrate;
   an underlayer of abrasion resistant hardcoat material coated on the film substrate and comprising a crosslinked acrylate polymer and metal oxide nanoparticles, the underlayer having a dried thickness of about 2 to about 6 microns and an abrasion delta haze of about 3 to about 5%; and
   at least one infrared reflective layer;
   a transparent protective top coat comprising a polysilazane, fluoro silane, fluoroalkyl silane, or combination thereof, wherein the protective top coat has a thickness of less than about 0.5 microns and is disposed over the infrared reflective layer;
   wherein the composite film has an emissivity of less than about 0.30; and
   wherein the underlayer is disposed between the film substrate and the infrared reflective layer; and
   selectively positioning the low emissivity composite film relative to a generally planar surface so that either;
   the low emissivity composite film is arranged in a first position generally coplanar with the surface to reduce emissivity through the surface; or
   the low emissivity composite film is arranged in a second position generally non-coplanar with the surface to not reduce emissivity through the surface.

2. The method of claim 1 wherein the surface comprises an exterior surface of a window.

3. The method of claim 1 wherein the surface comprises an interior surface of a window.

4. The method of claim 1 wherein the surface comprises a surface of a skylight.

5. The method of claim 1 wherein the surface comprises a surface of a wall.

6. The method of claim 1 wherein the low emissivity film is only in proximity to the surface when in the first position.

7. The method of claim 6 wherein the low emissivity composite film is rolled when moved from the first to the second position.

8. The method of claim 1 wherein the low emissivity film is in proximity to the surface when in both the first position and the second position.

9. The method of claim 8 wherein the low emissivity film is adhered to a shade which is positioned in proximity to the generally planar surface.

10. The method of claim 8 wherein the low emissivity film is adhered to a blind which is positioned in proximity to the generally planar surface.

11. The method of claim 1 wherein the infrared reflecting layer comprises at least one core metallic layer selected from aluminum, copper, gold, nickel, silver, platinum, palladium, tungsten, titanium, and alloys thereof.

12. The method of claim 11 wherein the infrared reflecting layer further comprises at least one thin metal film having a thickness of about 1 to about 5 nm and comprising at least one metal selected from nickel, chromium, niobium, gold, platinum, cobalt, zinc, molybdenum, zirconium, vanadium, mixtures thereof, and alloys thereof.

13. The method of claim 12 wherein the thin metal film comprises a nickel-chromium alloy.

14. The method of claim 11 wherein the infrared reflective layer comprises at least one spacer layer comprising a transparent conductive layer, a dielectric layer, or combinations thereof.

15. The method of claim 1 wherein the infrared reflective layer comprises at least one transparent conductive layer comprising indium zinc oxide.

16. The method of claim 1, wherein the metal oxide nanoparticles have a particle size of 0.1 micron or less.

17. The method of claim 1, wherein the underlayer comprises about 21 to about 65 weight percent nanoparticles, based on the total weight of the hardcoat material.

18. The method of claim 1, wherein the metal oxide nanoparticles comprise silicon dioxide, aluminum oxide, or a combination thereof.

* * * * *